United States Patent [19]

Bohrmann et al.

[11] 3,928,650

[45] Dec. 23, 1975

[54] PASTY DRY PRODUCT AND PROCESS FOR MAKING SAME

[75] Inventors: Hans Bohrmann, Talheim; Gerhard Schneider, Flein, both of Germany

[73] Assignee: CPC International Inc., Englewood Cliffs, N.J.

[22] Filed: July 24, 1974

[21] Appl. No.: 491,448

[52] U.S. Cl.................................. 426/579; 426/414
[51] Int. Cl.² ........................................ A23L 1/187
[58] Field of Search ........... 426/167, 203, 201, 195, 426/350, 414

[56] References Cited
UNITED STATES PATENTS

| | | | |
|---|---|---|---|
| 2,168,360 | 8/1939 | Musher | 426/203 |
| 3,619,209 | 11/1971 | Hegadorn et al. | 426/167 |
| 3,652,299 | 3/1972 | Penton | 426/203 |

*Primary Examiner*—Jeanette M. Hunter
*Attorney, Agent, or Firm*—Salvatore C. Mitri

[57] ABSTRACT

A pasty dry product for use in preparing puddings, which can be packaged in, and dispensed from, tubes, comprises a mixture of triglycerides of the unbranched (i.e., linear) fatty acids naturally present in edible fats and oils, ungelatinized starch, at least one sugar, and at least one emulsifier. To prepare a pudding from the product, the consumer introduces the requisite amount of the pasty product into a boiling aqueous liquid (e.g., milk, fruit juice, and/or water), stirs, whips, and allows to cool. Upon cooling the product sets to a pudding-like dessert.

10 Claims, No Drawings

PASTY DRY PRODUCT AND PROCESS FOR MAKING SAME

The invention relates to a pasty dry product for the preparation of desserts which may be filled in tubes and when stirred into boiling aqueous liquids and cooled will set and form a dessert.

Powdered desserts made from ungelatinized starch products, which have to be boiled to yield desserts, are well known. They contain as an essential ingredient starch which imparts texture to the prepared dessert and at the same time serves as a carrier for flavors and coloring matters. The amount of sugar necessary for sweetening the dessert as a rule has to be added by the consumer, but some powdered desserts are known which the sugar has already been added by the manufacturer. Powdered desserts in the form of tablets have also been proposed.

Apart from these powdered desserts on the basis of ungelatinized starch, which have to be boiled during preparation for gelatinizing the starch, so-called "instant desserts" have been gaining ground which contain as a binder pre-gelatinized, cold water-swelling starch. A disadvantage is connected with instant desserts in that during addition of the cold aqueous liquids, such as water or milk, bacteria may get into the dessert and cause food poisoning.

On the other hand, powdered desserts on the basis of ungelatinized starch products, which require boiling, have the disadvantage of having to be mixed with aqueous liquids while cold because otherwise unhomogeneous lumpy desserts would result.

The present invention relates to a pasty dry product which does not have the disadvantages of the known powdered desserts and instant desserts. From it a dessert is prepared by stirring it into boiling aqueous liquids, such as milk, fruit juice and/or water, and cooling. The new pasty dry product is characterized in that it consists of triglycerides of the unbranched (i.e., linear) fatty acids naturally present in edible oils and edible fats, ungelatinized starch, at least one sugar, and one or more suitable emulsifiers, preferably monoglycerides or mono/diglycerides. The pasty dry product perferably contains about 20 to 35 percent by weight of triglycerides, up to about 5 percent by weight of mono- or mono/diglycerides (and one or other emulsifier), about 15 to 35 percent by weight of starch and about 30 to 35 percent by weight of sugars.

Essential ingredients of the new pasty dry product, apart from ungelatinized starch, are the triglycerides as they impart to the product the texture necessary for filling in tubes and at the same time allow lump-free preparation by pressing the dry product into boiling aqueous liquids. Triglycerides preferably used for the purpose are vegetable oils and/or vegetable fats with a maximum melting point of about 40°C. Products containing less than about 20 percent by weight of triglycerides are difficult to press out of a tube, whereas products containing more than 35 percent by weight of triglycerides are rather soft and an even higher fat content at the expense of the content of starch and sugar leads to a dessert with a creamy, very soft texture.

The mono- and/or mono-diglycerides impart to the pasty dry product a uniform, homogeneous texture. It is also possible to replace the mono- or mono-diglycerides in the pasty dry product with, or as an extra ingredient, lecithin and/or other suitable emulsifiers in an amount of up to about 5 percent by weight.

Any ungelatinized starch that may be used for a dessert starch is suitable as a binder for the pasty dry product, e.g., native cereal starches like corn and wheat starch as well as waxy starches, and/or tuber or root starches like potato and tapioca starch, and chemically or enzymatically modified starches like phosphate modified starches. The amount of starch used is determined not only by the texture the dessert is desired to have but also by the amount of triglycerides and sugars contained in the pasty dry product. The average starch content of the dry product from about 15 to 35 percent by weight.

Sugar is usually employed in the form of sucrose, but any other kind of sugar like lactose, dextrose and dry glucose syrup, and/or sugar alcohols like sorbitol, xylitol or mixtures thereof may be used as well. The amount of sugar added is determined by the flavor the prepared dessert is desired to have. The average sugar content of the pasty dry product ranges from about 30 to 50 percent by weight.

Any specific change in the texture of the dessert may be obtained by adding to the pasty dry product as a binder apart from starch about 0.2 to 2.0 percent by weight of vegetable binders like agar, alginate, pectin, carrageenan and carob kernel meal, and/or gelatin.

Flavors, such as cocoa, vanillin, natural fruit powder and aromas, and natural and/or artificial coloring matters may of course be added to the pasty dry product as well.

The pasty dry product for the preparation of desserts is manufactured in a fashion that the mono-, di- and triglycerides and, if desired, the lecithin and/or other emulsifiers are melted together at about 50° to 60°C, and kneaded together with the starch, the sugars, flavors and coloring matters until a homogeneous mass is obtained, whereupon the product is vacuumized for a short time and then filled in tubes at about 20° to 30°C.

To prepare a dessert a specific amount depending on the composition of the pasty dry product is pressed out of the tube into a boiling aqueous liquid (milk, water, and/or fruit juice), stirred in by whipping with a whisk and evenly blended. For cooling the mass is filled into bowls or jars in the manner known and, if desired, unmolded after cooling. The amount of pasty dry product may be increased or reduced depending on whether a thick or thin texture is desired.

The following examples are illustrative of the composition and manufacture of the pasty dry products for the preparation of desserts as covered by this invention:

EXAMPLE 1

|  | kg |
|---|---|
| Sunflower oil | 24.80 |
| Glycerin monostearate | 0.25 |
| Lecithin | 0.50 |
| Sucrose (powder) | 39.20 |
| Corn starch | 25.83 |
| Cocoa (20 to 24% cocoa butter) | 9.40 |
| Vanillin | 0.02 |
| Total | 100.00 kg. |

The sunflower oil is blended at 60°C with the glycerin monostearate and the lecithin, whereupon the starch, sucrose, cocoa and vanillin are kneaded into the mass until a homogeneous paste is obtained. This paste is then filled in tubes at about 20° to 30°C and is ready for use.

To prepare a chocolate-flavored dessert about 130 g of the pasty dry product is pressed from the tube into 500 ml of boiling milk, whereupon the mixture is whipped with a whisk and stirred evenly. For cooling the mass is filled in bowls or jars. When cooled, the dessert may be unmolded.

The example was repeated replacing the corn starch with wheat starch, waxy maize starch, tapioca starch, and blends of the foregoing, with comparable results.

EXAMPLE 2

|  | kg |
|---|---|
| Peanut Oil | 16.4 |
| Palm oil | 10.2 |
| Glycerin monostearate | 1.2 |
| Lecithin | 1.1 |
| Sucrose (powder) | 43.4 |
| Corn starch | 27.7 |
| Orange flavor | |
| Coloring matter | |
| Total | 100.0 kg. |

The peanut oil, palm oil, glycerin monostearate and lecithin are blended at 50° to 60°C as in Example 1 and subsequently kneaded, with the remaining ingredients, until a homogeneous pasty mass has formed, which is filled in tubes.

To prepare an orange-flavored dessert 110 to 115 g of the pasty mass is pressed out of the tube as in Example 1 into 500 ml boiling aqueous liquid which consists of 250 ml orange juice and 250 ml water.

EXAMPLE 3

|  | kg |
|---|---|
| Peanut oil | 28.0 |
| Glycerin monostearate | 1.0 |
| Lecithin | 0.5 |
| Phosphate modified corn starch | 30.0 |
| Sucrose (powder) | 29.5 |
| Dextrose | 10.0 |
| Vanilla flavor | 1.0 |
| Coloring matter | |
| Total | 100.0 kg. |

The manufacture of the pasty dry product and the filling in tubes are carried out as in Example 1.

To prepare a vanilla-flavored dessert 100 to 110 g of the pasty dry product is required per 500 ml boiling milk.

The example was repeated except the dextrose was replaced with corn syrup solids; the resulting product was very similar to the one containing dextrose.

EXAMPLE 4

|  | Kg |
|---|---|
| Peanut Oil | 20.0 |
| Hydrogenated sunflower oil, melting point 40 to 42°C | 10.0 |
| Glycerin monostearate | 1.0 |
| Sucrose (powder) | 30.2 |
| Sorbitol | 5.0 |
| Corn starch | 15.5 |
| Potato starch | 8.5 |
| Natural fruit powder | 9.8 |
| Coloring matter | |
| Total | 100.0 kg. |

The manufacture of the pasty dry product and filling in tubes are carried out as in Example 1.

To prepare a fruit-flavored dessert 130 to 135 q of the pasty dry product is required per 500 ml of boiling aqueous liquid (water and/or fruit juice).

What is claimed is:

1. A pasty dry product for the preparation of desserts, which when stirred into boiling aqueous liquids and cooled sets and forms a dessert comprising a mixture of (a) triglycerides of the unbranched fatty acids naturally present in edible oils and edible fats, in an amount of between about 20 and about 35 percent by weight, said triglycerides having melting points not higher than 40°C, (b) ungelatinized starch, in an amount of between about 15 and 35 percent by weight, (c) at least one sugar, in an amount of between about 30 and 50 percent by weight, and (d) at least one emulsifier, in an amount of up to about 5 percent by weight.

2. A pasty dry product as in claim 1, wherein the emulsifier component is a member selected from the group consisting of monoglycerides, mono/diglycerides, lecithin, and mixtures thereof.

3. A pasty dry product as in claim 1, wherein the triglycerides used are vegetable oils having a melting point not higher than about 40°C.

4. A pasty dry product as in claim 1, wherein the ungelatinized starch component is a member selected from the group consisting of unmodified starch, chemically modified starch, enzymatically modified starch, and mixtures thereof.

5. A pasty dry product as in claim 1, wherein the ungelatinized starch component is a member selected from the group consisting of corn starch, wheat starch, waxy starch, potato starch, tapioca starch, and mixtures thereof.

6. A pasty dry product as in claim 1, wherein the sugar component is a member selected from the group consisting of sucrose, lactose, dextrose, dry glucose syrup, sorbitol, xylitol, and mixtures thereof.

7. A pasty dry product as in claim 1, which contains additionally about 0.2 to 2.0 percent by weight of vegetable binders.

8. A pasty dry product as in claim 1, characterized in that it contains additionally flavoring substances and coloring materials.

9. A pasty dry product for the preparation of desserts, comprising a mixture of:
   a. about 20 to about 35 percent vegetable oils having a melting point not higher than about 40°C;
   b. an effective amount, not exceeding about 5 percent by weight, of an emulsifier component selected from the group consisting of monoglycerides, mono/diglycerides, lecithin, and mixtures thereof;
   c. about 15 to about 35 percent by weight of ungelatinized starch; and
   d. about 30 to about 50 percent by weight of sugar.

10. A process for preparing a packaged product for use in the preparation of desserts, comprising the following steps:
   a. melting together, at about 50° to 60°C, triglycerides of the unbranched fatty acids naturally present in edible oils and fats and an emulsifier;
   b. kneading into the molten ingredients, until a homogeneous mass is formed, ungelatinized starch, sugar, and optionally flavorings and coloring materials.
   c. holding the product under vacuum for a short period of time; and
   d. filling the product into tubes at about 20° to 30°C.

* * * * *